US008657487B2

(12) United States Patent
Bingham et al.

(10) Patent No.: US 8,657,487 B2
(45) Date of Patent: Feb. 25, 2014

(54) MINI-CELL, ON-ORBIT, TEMPERATURE RE-CALIBRATION APPARATUS AND METHOD

(75) Inventors: Gail Bingham, Hyde Park, UT (US); Troy Shane Topham, Providence, UT (US); Alan Thurgood, Providence, UT (US)

(73) Assignee: Utah State University Research Foundation, North Logan, UT (US)

( * ) Notice: Subject to any disclaimer, the term of this patent is extended or adjusted under 35 U.S.C. 154(b) by 617 days.

(21) Appl. No.: 12/482,622

(22) Filed: Jun. 11, 2009

(65) Prior Publication Data

US 2009/0312976 A1    Dec. 17, 2009

Related U.S. Application Data

(60) Provisional application No. 61/060,753, filed on Jun. 11, 2008.

(51) Int. Cl.
*G01K 15/00* (2006.01)
*G12B 13/00* (2006.01)

(52) U.S. Cl.
USPC ............... 374/2; 374/1; 374/141; 250/338.1; 250/252.1; 250/339.09; 702/99

(58) Field of Classification Search
USPC ......... 374/1–3, 16, 27, 29, 31, 141, 100, 162, 374/208, 4, 5, 121, 129; 73/866.5; 702/99, 702/130
See application file for complete search history.

(56) References Cited

U.S. PATENT DOCUMENTS

| 3,267,956 | A | * | 8/1966 | Kline ........................... 137/360 |
| 3,474,249 | A | * | 10/1969 | Chandos et al. ............... 250/340 |
| 4,415,234 | A | | 11/1983 | Meyers |
| 4,627,740 | A | | 12/1986 | Jerde et al. |
| 6,232,614 | B1 | * | 5/2001 | Christy et al. ............ 250/504 R |
| 6,447,160 | B1 | | 9/2002 | Fraden |
| 6,515,285 | B1 | * | 2/2003 | Marshall et al. .............. 250/352 |
| 6,561,694 | B1 | | 5/2003 | Lerch et al. |
| 6,570,895 | B2 | | 5/2003 | Heberle |
| 6,908,224 | B2 | | 6/2005 | Schneider et al. |
| 7,063,457 | B2 | * | 6/2006 | Kang et al. ........................ 374/3 |

(Continued)

OTHER PUBLICATIONS

Sapritsky, V.I., Khlevnoy, B.B., Khromchenko, V.B., Lisiansky, B.E., Mekhotsev, S.N., Melenevsky, U.A., Morozova, S.P., Prohorov, A.V., Samoilov, L.N., Sapoval, V.I., Sudarev, K.A., Zelener, M.F., Precision Blackbody Sources for Radiometric Standards, Applied Optics, 1997, 5403-5408, vol. 36 Iss. 22, Optical Society of America.

(Continued)

*Primary Examiner* — Gail Verbitsky (57) ABSTRACT

A method for on-orbit calibration of the temperature sensors of a simulated blackbody is disclosed. The method may include selecting a simulated blackbody traveling in a microgravity environment and comprising a sensor, a container positioned proximate the senor and containing a material, and a heat transfer device positioned proximate the at least one container. The heat transfer device may transition the material through a phase change. The temperature sensor may monitor the temperature of the material during the phase change. A correction may be calculated to correct any disparity between the temperature reported by the temperature sensor during the phase change and the known plateau temperature corresponding to that phase change. The correction may be applied to subsequent temperature readings obtained using the temperature sensor.

12 Claims, 7 Drawing Sheets

(56) References Cited

U.S. PATENT DOCUMENTS

| | | | |
|---|---|---|---|
| 7,119,337 B1 * | 10/2006 | Johnson et al. | 250/339.13 |
| 7,495,220 B2 * | 2/2009 | Blackwell et al. | 250/338.1 |
| 7,511,274 B2 * | 3/2009 | Johnson et al. | 250/338.1 |
| 7,585,106 B2 * | 9/2009 | Yamada et al. | 374/2 |
| 7,837,382 B2 * | 11/2010 | Yamada | 374/1 |
| 7,866,882 B2 * | 1/2011 | Ko et al. | 374/2 |
| 7,968,848 B2 * | 6/2011 | Johnson et al. | 250/338.1 |
| 8,067,738 B1 * | 11/2011 | Heath et al. | 250/338.1 |
| 2002/0021739 A1 * | 2/2002 | Fraden | 374/2 |
| 2003/0026318 A1 * | 2/2003 | Machin | 374/2 |
| 2006/0232675 A1 * | 10/2006 | Chamberlain et al. | 348/164 |
| 2007/0221848 A1 * | 9/2007 | Johnson et al. | 250/339.02 |
| 2008/0170599 A1 * | 7/2008 | Lien et al. | 374/2 |
| 2008/0192797 A1 * | 8/2008 | Ko et al. | 374/2 |
| 2008/0317088 A1 * | 12/2008 | Yamada | 374/2 |
| 2009/0139975 A1 * | 6/2009 | Wen et al. | 219/400 |
| 2009/0282813 A1 * | 11/2009 | Kopinsky | 60/286 |
| 2012/0073308 A1 * | 3/2012 | Kim et al. | 62/3.2 |

OTHER PUBLICATIONS

Fred Best, Univ. Of Wis. Technical Dir., Space Sci. and Eng'g Ctr., Address at CALCON: On-orbit Absolute Temperature Calibration for CLARREO (Sep 10, 2007).

Fluke, ITS-90 Fixed Cell Points, http://us.flukecal.com/productsitemperature-calibration/its-90-temperature-standards/its-90-fixed-point-cells-1 (last visited Jul. 12, 2012).

Electro Optical Industries Multi-Point Standard Freeze-Point Blackbodies, http://www.electro-optical.com/pdf/eops719f.pdf.

* cited by examiner

Phase Transition Temperatures

| Substance | Temperature (K) |
|---|---|
| In | 429.7485 |
| Ga | 302.9146 |
| GaZn | 298.5 |
| GaSn | 293.5 |
| GaIn | 288.5 |
| $H_2O$ | 273.15 |
| Hg | 234.32 |

MINI-CELL, ON-ORBIT, TEMPERATURE RE-CALIBRATION APPARATUS AND METHOD

RELATED APPLICATIONS

This application claims the benefit of U.S. Provisional Patent Application Ser. No. 61/060,753 filed Jun. 11, 2008, which is hereby incorporated by reference.

BACKGROUND

1. The Field of the Invention

This invention relates to infrared (IR) instruments and, more particularly, to novel systems and methods for long-term, in-flight calibration of IR instruments.

2. The Background Art

IR instruments must periodically be calibrated in order to provide data of desired or required accuracy. However, the accuracy and stability of temperature sensors used in such calibration procedures can be affected by numerous factors. For example, measurement systems using on-board blackbodies as reference points are subject to temperature sensor drift.

Factors affecting the performance of a temperature sensor may include sensor configuration and type. Other factors may include the thermal environment in which a temperature sensor operates, shock or vibration experienced by a temperature sensor, the nature of the thermal contact between a temperature sensor and a source or blackbody, strain in connecting wires, self heating, and age of a temperature sensor. Any of these factors may cause drift and necessitate recalibration.

In the past, to better understand the behavior of a temperature sensor, testing has been performed in the environment in which the temperature sensor will operate. Multiple cycles over the range of operation have been used to establish drift rates and the noise characteristic for particular temperature sensors. Accordingly, manufacturers can publish average drift rates for their temperature sensors. These drift rates are, at best, typically about 25 mK/year.

Manufacturers often recommend that temperature sensors be re-calibrated yearly. However, calibration may be performed more or less frequently based on performance, requirements, and environment. IR instruments measuring climate conditions typically have expected lifetimes of seven to ten years in orbit (i.e., sometimes called space, outer space, flight, or a micro-gravity environment). Accordingly, re-calibration of IR instruments is a necessity.

Current methods for compensating for drift include cross correlation of sensor data with that of other instruments viewing the same Earth scene. This Simultaneous Nadir Overpass (SNO) method allows offsets between instruments to be corrected, but does not allow absolute calibration. What is needed is a system providing a long-term, in-flight, calibration system, particularly one that may be relied upon as consistent and absolute.

SUMMARY OF THE INVENTION

In view of the foregoing, in accordance with the invention as embodied and broadly described herein, a method and apparatus are disclosed in one embodiment of the present invention as including a temperature calibration system based on the melting or solidification of one or more phase-change materials (PCMs). The system may include a cell containing a phase-change material placed on in contact with a radiant portion of the blackbody. The cell may be heated such that the phase-change material contained therewithin passes through a phase change.

In selected embodiments, a heat transfer device (e.g., heater, thermoelectric cooler (TEC)) located between the cell and the radiant portion of the blackbody may be used to heat or cool the phase-change material to effect the phase change. One or more temperature sensors (e.g., thermistors, platinum resistance thermometers (PRTs)) to be calibrated may record the temperature change with time and identify the temperature plateau corresponding to the phase change.

The phase change temperature recorded during solidification (i.e., freezing) and the phase change temperature recorded during melting are material properties that do not change. Thus, either the melting or freezing temperature may be used as a calibration reference for any temperature sensors monitoring the phase-change.

This may be done by comparing the known phase-change temperature to the actual reading or readings collected from the temperature sensors. A calibration correction or offset may be calculated to correct any deviation between the known phase-change temperature and the measured and consequently recorded phase-change temperature. This correction may then be applied to future readings collected from the corresponding temperature sensors.

In selected embodiments, one temperature sensor may be used to calibrate another. For example, a second temperature sensor to be calibrated may be located proximate a radiant portion of a blackbody. The temperature of a blackbody may be monitored. When the temperature reaches a steady state, the cell of phase-change material and the radiant portion of the blackbody are in thermal equilibrium. Accordingly, a first temperature sensor located proximate the cell should indicate the same temperature as a second temperature sensor located proximate the radiant portion.

Because the cell of phase-change material is used to calibrate the first temperature sensor, its output may be trusted. Accordingly, the temperatures reported by the first and second temperature sensors may be compared. A calibration correction or offset may be calculated to correct any deviation between the temperature reported by the first temperature sensor and the temperature reported by the second temperature sensor. This correction may then be applied to future readings collected from the second temperature sensor.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings.

Figure 1:
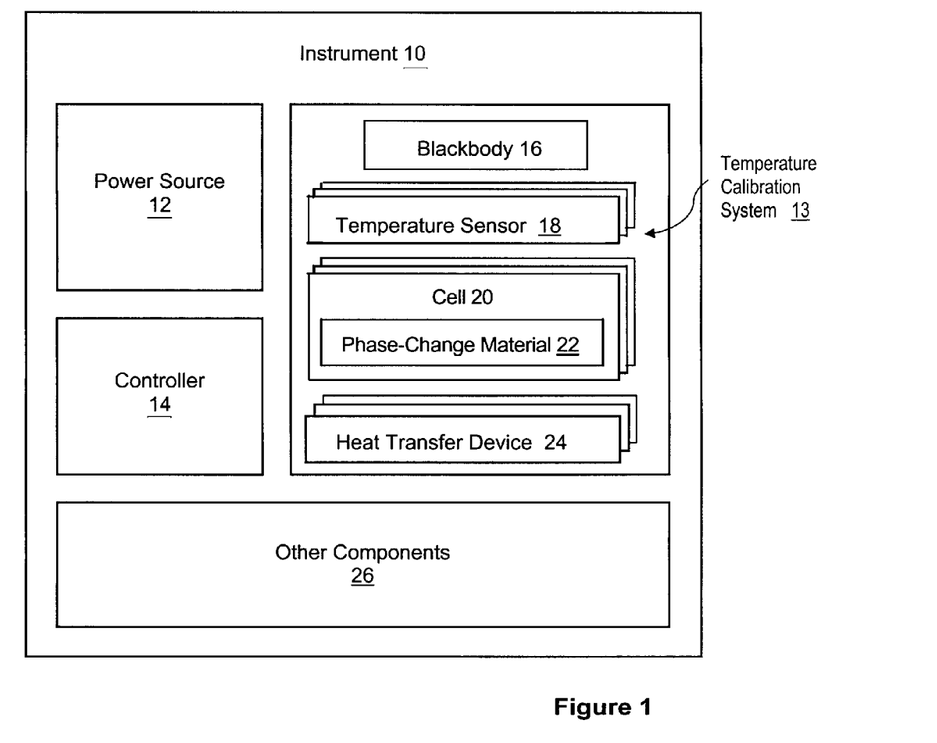
FIG. 1 is a schematic block diagram of an embodiment of an instrument in accordance with the present invention.

Referring to FIG. 1, an instrument 10 in accordance with the present invention may include various sub-components as desired or required. For example, an instrument 10 may include a power source 12 for supplying the various components of an instrument 10 with the electrical power they need. Additionally, an instrument 10 may include a controller 14 comprising one or more computers operably connected and programmed to control operation of the instrument 10.

In general, an instrument 10 must be well characterized to make scientific measurements of high accuracy and low uncertainty. Accordingly, for instruments 10 placed in orbit, calibration and validation are part of the entire process of instrument design, construction, and flight. For example, testing of an IR instrument 10 occurs prior to launch, and again when the IR instrument 10 begins on-orbit operations. IR instruments 10 are often used to collect climate measurements. Because climate measurements must be collected over long periods of time, the stability and repeatability of IR instruments 10 can be extremely important.

Ground and initial on-orbit testing, while important, are not adequate for long duration measurements. Accordingly, an IR instrument 10 must periodically view a source 16 of known radiance to be re-calibrated and maintain accuracy and uncertainty within acceptable levels. Such sources 16 are often simulated blackbodies 16. Accordingly, "source" and "blackbody" typically refer to the same thing.

Unfortunately, the temperature sensors 18 of a blackbody 16 may be subject to drift. With the passage of time, temperature sensors 18 that are not re-calibrated report with less accuracy and certainty the temperature of the blackbody 16. These inaccuracies and uncertainties are passed to any instrument 10 using the blackbody 16 as a reference point.

Embodiments of the present invention enable the temperature sensors 18 of a blackbody 16 to be re-calibrated during on-orbit operations. Properly calibrated blackbodies 16 may then be used to re-calibrate an instrument 10 during on-orbit operations. So calibrated, an instrument 10 may collect accurate measurements over long periods of time.

To achieve very high accuracy, an instrument 10 in accordance with the present invention may balance parameters that affect it, mitigate various effects when possible, and characterize or quantify the effects that are beyond control. In selected embodiments, a temperature calibration system 13 in accordance with the present invention may include a blackbody 16 and one or more cells 20 or containers 20 containing a quantity of phase-change material (PCM) 22. The phase-change material 22 may form part of an absolute-temperature, reference system or standard.

To transition a phase-change material 22 through a phase change, a temperature calibration system 13 may include one or more heat transfer devices 24. A heat transfer device 24 may be positioned and configured to heat or cool one or more cells 20 containing phase-change material 22.

In addition to the components 12, 14, 16 discussed hereinabove, an instrument 10 in accordance with the present invention may include other components 26 as desired or necessary.

Figure 2:
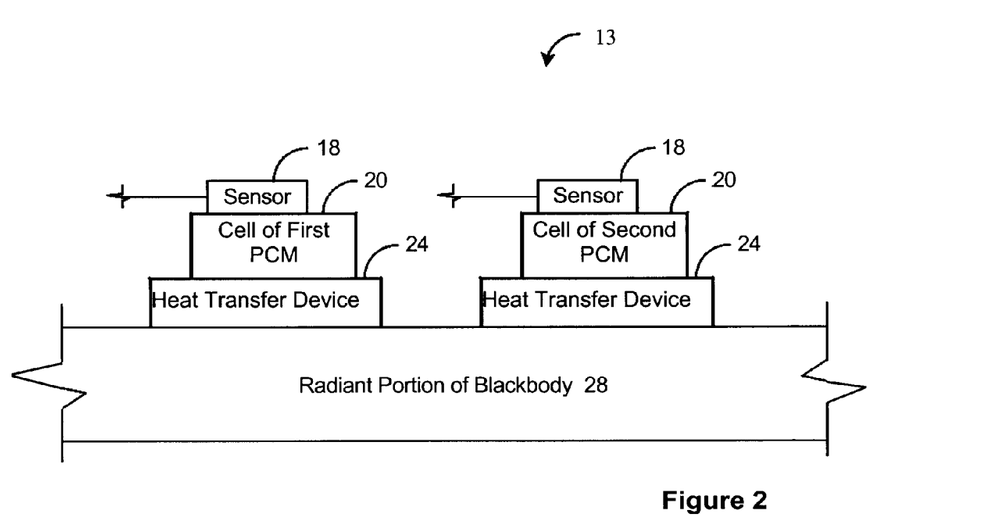
FIG. 2 is a schematic block diagram of one embodiment of a phase-change calibration system in accordance with the present invention applied to a blackbody.

Referring to FIG. 2, direct re-calibration of the temperature sensor 18 or sensors 18 may be accomplished by making thermal contact between the blackbody's radiant portion 28, body 28, surface 28, cavity 28, or the like (i.e., the portion of the blackbody 16 viewed by the instrument 10 during calibration) and one or more cells 20 containing phase-change material 22. The temperature sensor 18 or sensors 18 may be positioned to track the temperature of the phase-change material 22 contained within the cells 20. In selected embodiments, a temperature sensor 18 may be located externally with respect to a cell 20, yet be thermally connected to it.

During normal operation, the temperature of a temperature sensor 18 may closely follow or track the temperature of a cell 20 and the contents 22 thereof. During the re-calibration, a cell 20 (with its temperature sensor 18 or sensors 18) may be heated or cooled across the phase transition of the phase-change material 22 contained within the cell 20. Once a temperature sensor 18 has been re-calibrated and returned to thermal equilibrium with a blackbody 16, its response or output may be transferred to or become the output of the blackbody 16.

In selected embodiments, one or more heat transfer devices 24 may form the thermal interface between a cell 20 and the radiant portion 28 of a blackbody 16. In such embodiments, the only significant conductive thermal path from the cell 20 to the radiant portion 28 may be through the heat transfer device 24. Accordingly, the temperature of a cell 20 may be controlled substantially independently from the temperature of the radiant portion 28 of the blackbody 16. This may support calibration of the temperature sensors 18 while the blackbody 16 remains near its operational temperature.

One or more heat transfer devices 24 of a blackbody 16 in accordance with the present invention may be configured as thermoelectric coolers (TEC) 24. A thermoelectric cooler 24 may create a heat flux at the junction of two different types of materials. In general, a thermoelectric cooler 24 may be a solid-state heat pump that consumes electrical energy in transferring heat from one side thereof to the other.

A typical, unpowered thermoelectric cooler 24 may have a thermal conductivity of from about one to about two Watts per milli-Kelvin (W/mK). This thermal conductivity is roughly the same as glass and ceramic. Accordingly, when a thermoelectric cooler 24 is positioned between a cell 20 and the rest of the blackbody 16, and the cell 20 is adequately insulated from external heat loads, the temperature of the cell 20 may track the temperature of the blackbody 16 within a few milli-Kelvin (mK).

A temperature calibration system 13 in accordance with the present invention may include one or more cells 20. The cells 20 of the temperature calibration system 13 may each contain the same phase-change material 22 or a different phase-change material 22. Alternatively, more than one cell 20 may contain a first phase-change material 22, while other cells 20 contain other phase-change materials 22. For example, the temperature calibration system 13 may include two cells 20 containing a first phase-change material 22 and two cells 20 containing a second phase-change material 22.

Figure 3:
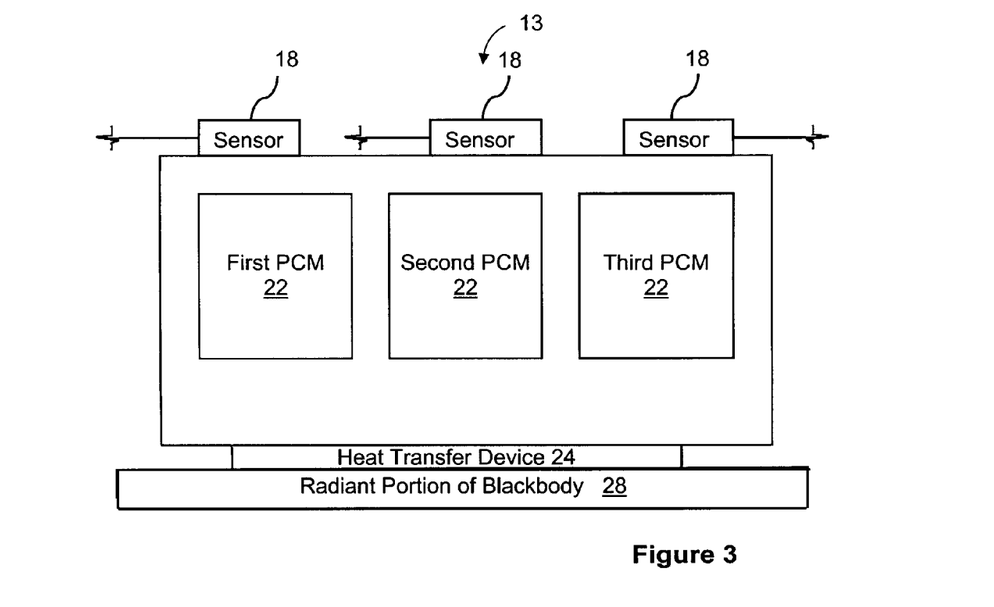
FIG. 3 is a schematic block diagram of another embodiment of a phase-change calibration system in accordance with the present invention applied to a blackbody.

Referring to FIG. 3, in certain embodiments, one or more cells 20 containing phase-change material 22 may be incorporated into the temperature calibration system 13. In such embodiments, the temperature calibration system 13 may be cycled over the calibration temperature range (i.e., a range containing the phase transition temperatures of the various phase-change materials 22 contained within the embedded cells 20). To accomplish this cycling, a heat transfer device 24 (e.g., heater, thermoelectric cooler 24) may thermally connect a blackbody 16 to a heat sink 30 forming part of the instrument 10. Thermal energy may be pushed to or pulled from the system as needed.

Cycling a blackbody 16 over the entire calibration temperature range may require removal of the blackbody 16 from use by the IR instrument 10 for a significant period of time (e.g., days). Alternatively, certain phase-change materials 22 comprising metal eutectics may be used. Such materials 22 may have phase-transition temperatures within or near the operational temperature range of a blackbody 16 in accordance with the present invention. Accordingly, in such embodiments, even a system comprising one or more cells 20 may be used by an instrument 10 during calibration of the blackbody 16.

Figure 4:
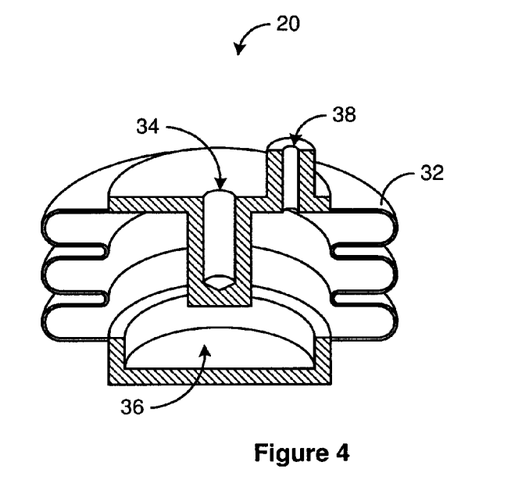
FIG. 4 is a cut-away, perspective view of one embodiment of a container for housing a phase-change material in accordance with the present invention.

Referring to FIG. 4, a cell 20 in accordance with the present invention may have any suitable configuration. In selected embodiments, smaller cells 20 may have certain advantages over larger ones. On orbit, power is not unlimited. Moreover, the more an instrument 10 weighs, the more costly it typically is to place in orbit. Smaller cells 20 may require less electrical power to cycle through the entire calibration temperature range. Additionally, smaller cells 20, and the smaller amount of phase-change material 22 they contain, may simply weigh less.

In selected embodiments, a cell 20 may be formed to accommodate expansion or contraction of the phase-change material 22. For example, in certain embodiments, a cell 20 may be formed with one or more gussets 32. The gussets 32 may provide regions of increased flexibility, permitting a cell 20 to change in volume to accommodate an expanding or shrinking phase-change material 22.

A cell 20 in accordance with the present invention may include various features to improve its performance. For example, a cell 20 may include a cavity 34 extending from the exterior of the cell 20 toward the interior 36 thereof. A temperature sensor 18 may be placed and secured within the cavity 34. Such a configuration may effectively envelope the temperature sensor 18 within the phase-change material 22.

A cell 20 may have other features as desired or necessary. For example, in selected embodiments, a cell 20 may include an aperture 38 or opening 38 providing access to the interior 36 of the cell 20. The aperture 38 may be used to place a phase-change material within the cell 20. Once the cell 20 is filled, the aperture 38 may be closed or sealed.

Figure 5:
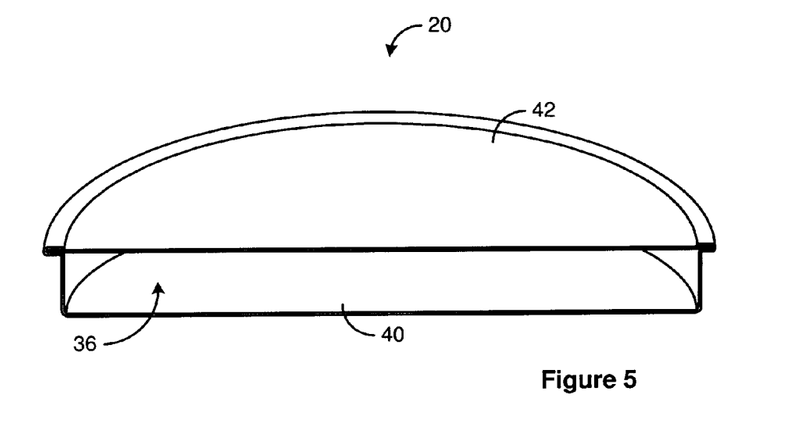
FIG. 5 is a cut-away, perspective view of another embodiment of a container for housing a phase-change material in accordance with the present invention.

Referring to FIG. 5, a cell 20 in accordance with the present invention may include various features to improve manufacturability. In selected embodiments, a cell 20 may be formed of a base 40 and a lid 42. In such embodiments, the base 40 and lid 42 may be formed to facilitate securement and sealing therebetween. For example, a base 40 and lid 42 may be formed to accept a seal wherein one is folded over and crimped against the other in a canning-type seal. In other embodiments, welding (e.g., ultrasonic welding, spin welding, etc.) may be used to connect a base 40 to a lid 42.

In certain embodiments, a cell 20 may comprise a sealed pouch formed of flexible material. To accommodate any thermal expansion of the phase-change material 22 contained therewithin, the pouch may transition from a comparatively flatter profile to a more rounded profile. Such a pouch may be secured to a radiant portion 28 and temperature sensor 18 in any suitable arrangement. In one embodiment, a clamp may hold a temperature sensor 18 in contact with a pouch and hold the pouch against the radiant portion 28. The clamp may be formed in such a manner as to minimize or eliminate thermal losses or loads that would otherwise be imposed thereby.

Figure 6:
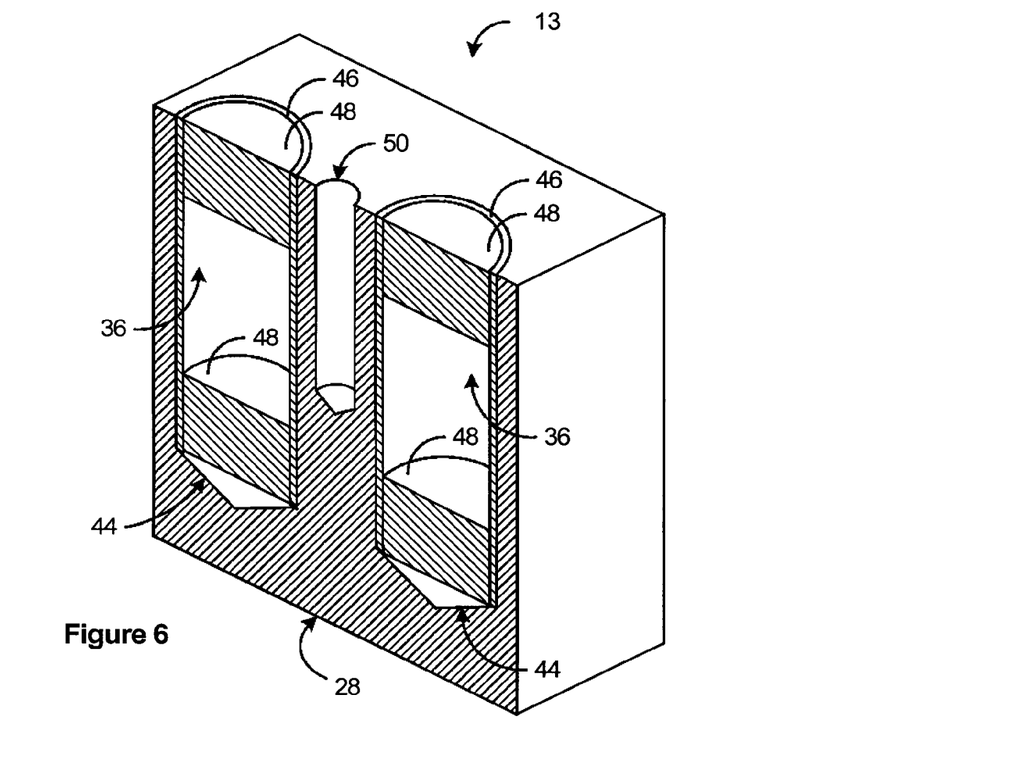
FIG. 6 is a cut-away, perspective view of one embodiment of a container for housing multiple phase-change materials in accordance with the present invention.

Referring to FIG. 6, in selected embodiments, a cell 20 in accordance with the present invention may comprise an insert embedded within a portion of a temperature calibration system 13. For example, in one embodiment, an aperture 44 may be machined within a portion of the system. A cell 20 having a size and shape corresponding to the aperture 44 may be inserted therewithin.

For example, an aperture 44 may be substantially cylindrical in shape. A cell 20 placed within the aperture 44 may have a corresponding or matching cylindrical shape. If desired or necessary, a filler or interface material (e.g., thermal grease) may be placed between a cell 20 and the corresponding aperture 44 to improve the heat transfer therebetween.

In selected embodiments, a cylindrical cell 20 may comprise a tube 46 sealed at each end with a closure 48. Certain closures 48 may be formed as a monolithic extension of the tube 46 (e.g., be left to seal one end of the tube 46 during a manufacturing process). Other closures 48 may engage a tube 46 with threads, glue, welding (e.g., ultrasonic welding, spin welding, etc.), or the like. Collectively, the tube 46 and closures 48 may form an enclosure containing a phase-change material 22.

A cell 20 in accordance with the present invention may be formed of any suitable material or materials. In certain embodiments, a cell 20 may comprise a hermetically sealed, "fluorocarbon-lined" (e.g., TEFLON™) container. This may prevent contamination of the phase-change material and provide an absolute reference that will not change with time. For example, in selected embodiments, a tube 46 and corresponding closures 48 may be formed of a fluorocarbon polymer.

In selected embodiments, it may be desirable for a single temperature sensor 18 to monitor the temperature of multiple cells 20. Accordingly, a temperature calibration system 13 may be formed to provide that particular temperature sensor 18 with a direct thermal path to those multiple cells 20. For example, in one embodiment, a cavity 50 may be formed at a location between two cells 20. A temperature sensor 18 may be placed and secured within the cavity 50. Such a configuration may permit the temperature sensor 18 to effectively monitor the temperature of both cells 20.

Figure 7:
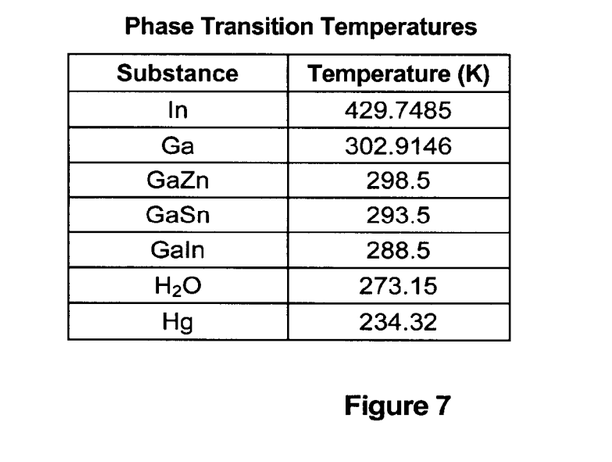
FIG. 7 is a table illustrating the phase transition temperature of selected materials that may be used as phase-change materials in accordance with the present invention.

Referring to FIG. 7, in selected embodiments in accordance with the present invention, the 70 K span between the melting points of mercury and gallium may be too large to meet operational requirements. For example, relatively large changes in temperature (e.g., between disparate phase-change temperatures) may heat or cool a blackbody 16 excessively. Thus, during calibration exercises using such materials, the blackbody 16 may be unsuitable for use as a reference by an instrument 10. Moreover, greater temperature changes require greater, and perhaps excessive or unavailable, amounts of energy to effect and correct a desired temperature change. Accordingly, in selected embodiments, such materials may be unsuitable for concurrent use as phase-change materials 22 in accordance with the present invention.

To provide temperature points having the most desirable values within the normal operating range of selected instruments 10 (e.g., IR instruments 10), the present invention may employ one or more gallium alloys as phase-change materials. In selected embodiments in accordance with the present invention, phase transitions (from solid to liquid or vice versa) of eutectic gallium alloys, pure gallium, and other substances may provide known, standardized temperatures facilitating re-calibration for the temperature sensor 18 or sensors 18 of a blackbody 16 over the life of a mission.

For selected instruments 10, calibration may require at least two known or standard temperature reference points. In such embodiments, a temperature calibration system 13 containing embedded cells 20 may use gallium and water as the two phase-change materials 22. The solidification temperatures for these two materials may be reached without significant overcooling in small cells 20. Moreover, for an IR instrument 10 with a typical aperture, temperatures between 273 K and 303 K need not take the blackbody 16 out of the dynamic operating range of the instrument 10.

In other embodiments, a temperature calibration system 13 with embedded cells 20 may include three or more temperature references points. Accordingly, in such embodiments, other materials 22 providing one or two alternative eutectic points may be used. Use of these alternative materials 22 may provide an array of close, fixed, transition temperatures that may maintain the blackbody 16 close to an optimal temperature near the maximum of the operating range.

For non-temperature-controlled blackbodies 16, fixed temperature references may be attached thereto, external to the radiant portion 28. A fixed temperature reference near the desired operating temperature and two within plus or minus 15 K of the operating temperature may be preferred. By keeping the mass of the cells 20 providing the fixed reference temperatures small, each may be serially heated or cooled through its phase transition temperature without significantly disturbing the temperature uniformity of the radiant portion 28.

Figure 8:
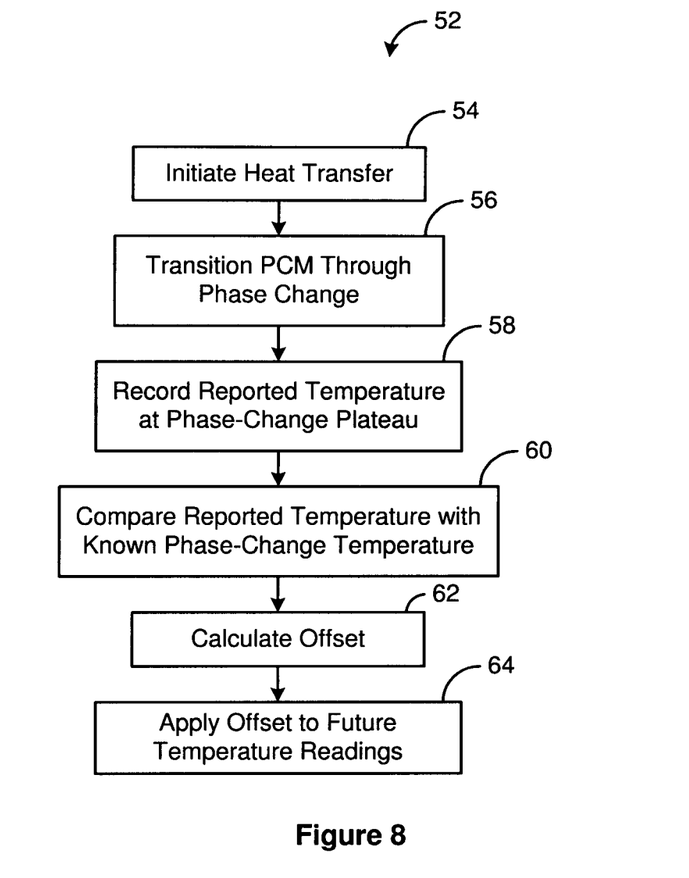
FIG. 8 is a schematic block diagram of one embodiment of a method in accordance with the present invention.

Referring to FIG. 8, to calibrate 52 a temperature sensor 18 of a blackbody 16 using an external cell 20 containing a phase-change material 22, heat may be transferred 54 to or from the phase-change material 22 using a heat transfer device 24 such as a thermoelectric cooler 24. The transfer 54 of heat may transition 56 the phase-change material 22 through a phase change. This may create a response plateau of constant temperature, which may be recorded 58 by the temperature sensor 18 being calibrated.

The known temperature corresponding to the phase change may then be compared 60 to the actual reading or readings collected 58 from the temperature sensor 18. A calibration correction or offset may then be calculated 62 and applied 64 to future readings collected from the temperature sensor 18.

In embodiments utilizing a heat transfer device 24 such as a thermoelectric cooler 24, power to the thermoelectric cooler 24 may be terminated once the phase-change material 22 has passed through the phase change. Accordingly, the cell 20 and phase-change material 22 contained therein may return to an equilibrium temperature. In selected embodiments, any heat removed from the blackbody 16 during the phase change (e.g., melting) of the phase-change material 22 may largely be returned to the blackbody 16. Alternatively, any heat transferred to the blackbody 16 during the phase change (e.g., freezing) of the phase-change material 22 may largely be removed from the blackbody 16.

During re-calibration, the amount of heat added to or removed from the cell 20 may be comparatively small. Accordingly, in selected embodiments, a thermoelectric cooler 24 may pull the heat added to the cell 20 directly from the radiant portion 28 of the blackbody 16. Similarly, a thermoelectric cooler 24 may push directly into the radiant portion 28 of the blackbody 16 the heat pulled from the cell 20. Due to the comparatively small amounts of heat involved, this "pulling" and "pushing," or transferring heat to and from the radiant portion 28 of the blackbody 16 may leave the performance of the blackbody 16 substantially undisturbed.

Figure 9:
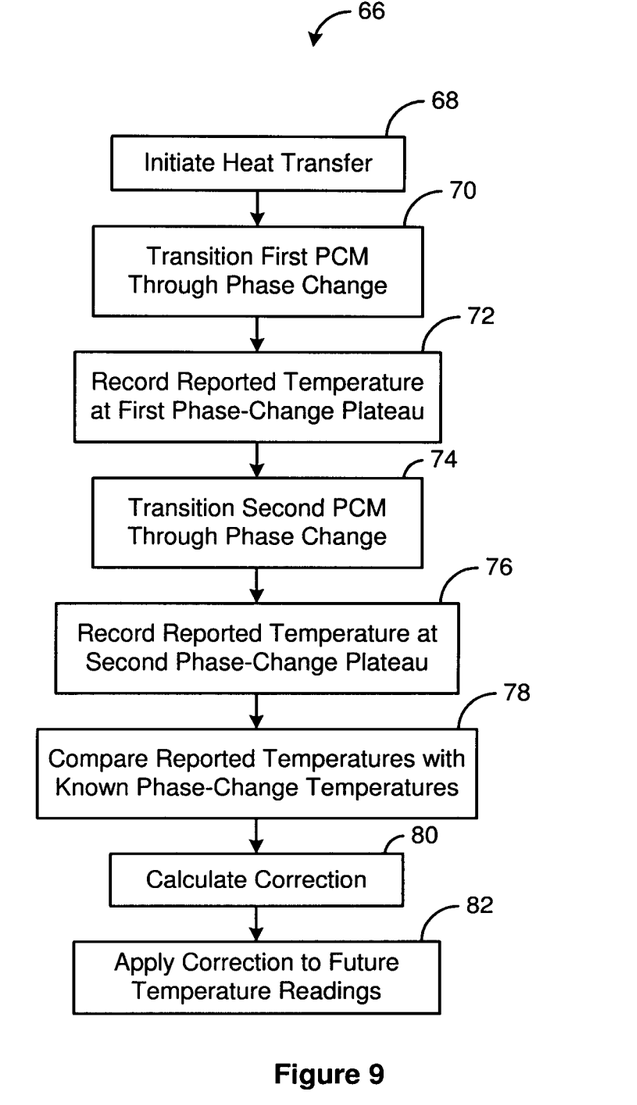
FIG. 9 is a schematic block diagram of another embodiment of a method in accordance with the present invention.

Referring to FIG. 9, calibrations 66 involving multiple phase-change materials 22 may proceed in a manner similar to those 52 involving one phase-change material 22. To begin the process 66, heat may be transferred 68 to or from a first phase-change material 22 using a heat transfer device 24 such as a thermoelectric cooler 24. The transfer 68 of heat may transition 70 the first phase-change material 22 through a phase change. This may create a response plateau of constant temperature, which may be recorded 72 by a temperature sensor 18 being calibrated.

These initial steps 68, 70, 72 may be repeated with the other phase-change materials 22. For example, if a temperature calibration system 13 includes a second phase-change material 22, heat may be transferred 68 to or from the second phase-change material 22 using a heat transfer device 24 such as a thermoelectric cooler 24. The transfer 68 of heat may transition 74 the second phase-change material 22 through a phase change. This may create a response plateau of constant temperature, which may be recorded 76 by a temperature sensor 18 being calibrated (potentially a different temperature sensor 18 from that monitoring the first phase-change material 22).

The known temperatures corresponding to the phase changes may then be compared 78 to the actual reading or readings collected 72, 76 from the temperature sensor 18 or sensors 18. A calibration correction or offset may then be calculated 80 and applied 82 to future readings collected from the temperature sensor 18 or sensors 18. Accordingly, a blackbody 16 may be calibrated to accurately report temperatures across its operational range.

Figure 10:
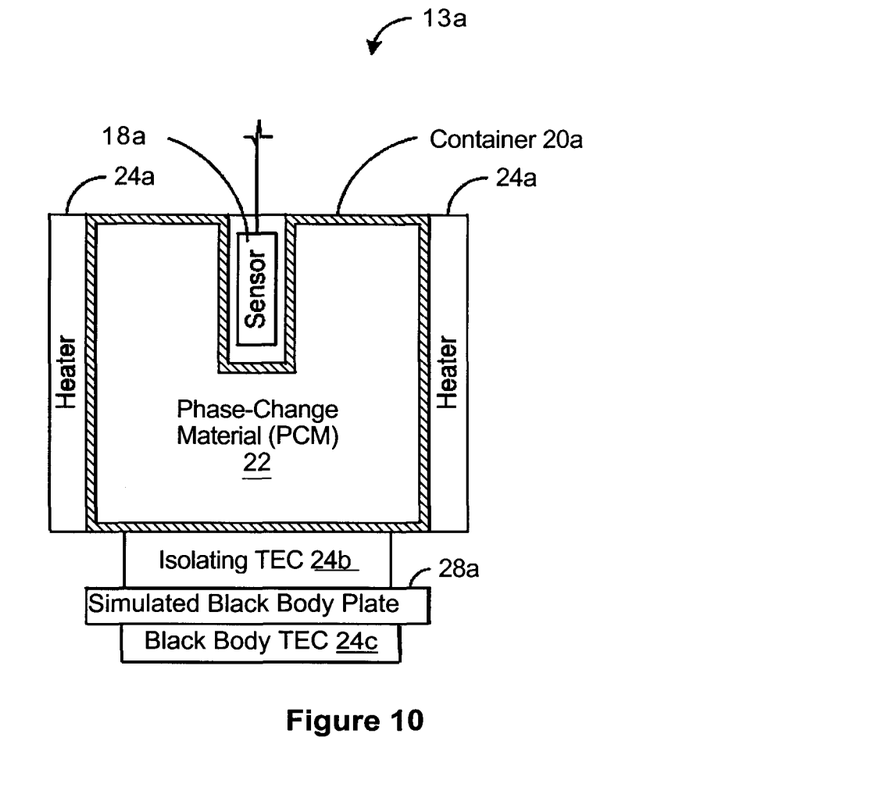
FIG. 10 is a schematic block diagram of a prototype temperature reference module in accordance with the present invention.

Referring to FIG. 10, a prototype temperature calibration system 13a was built to evaluate certain concepts presented herein. In the prototype 13a, twenty-five grams of a phase-change material 22a were housed in a cell 20a comprising a stainless steel bellows container to accommodate material expansion during phase change. A small thermistor 18a was placed within the well of a stainless steel probe tube to track the temperature of the phase-change material 22.

The cell 20a was surrounded radially with a resistive heating element 24a and was thermally linked to a thermoelectric cooler 24b on the bottom. The opposite, operative surface of this thermoelectric cooler 24b was attached to a small aluminum plate 28a, simulating the radiant portion 28 of a blackbody 16.

The temperature of the prototype 13a was controlled with another thermoelectric cooler 24c connected to the aluminum plate 28a. The purpose of this dual, thermoelectric-cooler arrangement was to allow simulation of the effects of varying blackbody temperatures on the system. These effects were observed by monitoring the power applied to the heater 24a and the thermoelectric coolers 24b, 24c. To improve the quality of the experiment, the space around the cell 20*a* was insulated to reduce or eliminate heat flow from sources other than the other components of the prototype 13*a*.

The experiment showed that the twenty-five grams of phase-change material 22 appeared likely excessive, requiring an undesirably high consumption of power to avoid inducing a temperature anomaly in a small radiant portion 28*a*. Based on the result of the experiment, it is contemplated that a small cell 20 may complete a 20° C. offset calibration in one hour, while injecting less than 200 mW into the radiant portion 28 of the blackbody 16. The results also indicated that a smaller, comparatively flatter cell 20 may require the use of only one heat transfer device 24 (e.g., thermoelectric cooler 24) to control the temperature of the cell 20. Thus, the radial heater 24*a* may be unnecessary for homogenous thermal control.

The present invention may be embodied in other specific forms without departing from its fundamental functions or essential characteristics. The described embodiments are to be considered in all respects only as illustrative, and not restrictive. All changes which come within the meaning and range of equivalency of the illustrative embodiments are to be embraced within their scope.

Wherefore, we claim:

1. A method comprising:
    selecting a black body comprising:
        a radiant portion configured to calibrate an infrared instrument viewing the radiant portion of the black body,
        at least one temperature sensor,
        at least one container positioned proximate the at least one temperature sensor and containing a material, and
        at least one heat transfer device positioned between the at least one container and the radiant portion;
    moving, by the at least one heat transfer device, the material through a phase change by passing thermal energy from the at least one container to the radiant portion;
    monitoring, during the moving, a signal output from the at least one temperature sensor;
    converting the signal output into at least one temperature reading;
    calibrating the at least one temperature sensor by calculating a correction correcting a disparity between a reading of the at least one temperature sensor and a known plateau temperature corresponding to the phase change;
    returning the at least one temperature sensor to thermal equilibrium with the blackbody; and
    executing a blackbody calibration comprising applying the correction to subsequent temperature readings obtained using the at least one temperature sensor.

2. The method of claim 1, further comprising:
    selecting the infrared instrument, the infrared instrument traveling with the black body; and
    executing an infrared instrument calibration comprising sensing the electromagnetic radiation emanating from the blackbody after execution of the blackbody calibration.

3. The method of claim 2, wherein the material comprises gallium.

4. The method of claim 1, wherein the material comprises a eutectic alloy.

5. The method of claim 4, wherein the material consists of a eutectic alloy.

6. The method of claim 5, wherein the eutectic alloy comprises gallium.

7. The method of claim 1, wherein moving comprises passing thermal energy from the radiant portion to the at least one container.

8. The method of claim 2, wherein the instrument comprises an infrared sensor.

9. A method comprising:
    selecting a blackbody comprising:
        a radiant portion configured to calibrate an infrared instrument,
        at least one temperature sensor,
        at least one container positioned proximate the at least one temperature sensor and containing a material, and
        at least one heat transfer device positioned between the at least one container and the radiant portion;
    altering, by the at least one heat transfer device, the material through a phase change;
    monitoring, during the altering, a signal output from the at least one temperature sensor;
    converting the signal output into at least one temperature reading;
    calibrating the at least one temperature sensor by calculating a correction correcting a disparity between a reading of the at least one temperature sensor and a known plateau temperature corresponding to the phase change;
    returning the at least one temperature sensor to thermal equilibrium with the blackbody;
    executing a blackbody calibration comprising applying the correction to subsequent temperature readings obtained using the at least one temperature sensor; and
    wherein the only significant conductive thermal path from the at least one container to the radiant portion is through the heat transfer device.

10. The method of claim 9, wherein the at least one temperature sensor is positioned on the at least one container.

11. A method comprising:
    selecting a blackbody comprising:
        a first temperature sensor and a second temperature sensor;
        a first container and a second container, the first container containing a first material, the second container containing a second material;
        a radiant portion;
        a first thermoelectric cooling device positioned between the radiant portion and the first container such that the only significant conductive thermal path from the first container to the radiant portion is through the first thermoelectric cooling device;
        a second thermoelectric cooling device positioned between the radiant portion and the second container such that the only significant conductive thermal path from the second container to the radiant portion is through the second thermoelectric cooling device;
    altering, by the first and second thermoelectric cooling devices, the first and second materials through a phase change;
    monitoring, during the altering, a signal output from the first and second temperature sensors;
    converting the signal output into at least one temperature reading;
    calculating a correction correcting a disparity between the at least one temperature reading and a known plateau temperature corresponding to the phase change; and
    executing a first calibration corresponding to the blackbody, the first calibration comprising applying the correction to subsequent temperature readings obtained using the first and second temperature sensors.

12. A method comprising:
selecting a blackbody comprising:
- at least one temperature sensor,
- a container containing a first material and a second material, and a second material, and
- a thermoelectric cooling device positioned between the blackbody and the container such that the only significant conductive thermal path from the container to the blackbody is through the thermoelectric cooling device;

moving, by the thermoelectric cooling device, the first material through a phase change thereof;

moving, by the thermoelectric cooling device, the second material through a phase change thereof;

deriving, from a signal output by the at least one temperature sensor, a first temperature corresponding to the first material during the phase change thereof and a second temperature corresponding to the second material during the phase change thereof;

calculating a correction correcting a disparity between the first and second temperatures and know temperatures corresponding to the phase change of the first material and the phase change of the second material;

executing a first calibration corresponding to the blackbody, the first calibration comprising applying the correction to subsequent temperature readings obtained using the at least one temperature sensor;

selecting an instrument traveling with the blackbody in the micro-gravity environment; and executing a second calibration corresponding to the instrument, the second calibration comprising sensing the electromagnetic radiation emanating from the blackbody after execution of the first calibration.

* * * * *